United States Patent
Liu et al.

(10) Patent No.: US 9,565,584 B2
(45) Date of Patent: Feb. 7, 2017

(54) HUMAN MOBILITY RULE-BASED DEVICE LOCATION TRACKING

(71) Applicant: Cisco Technology, Inc., San Jose, CA (US)

(72) Inventors: Hui Liu, San Jose, CA (US); Santosh Pandey, Newark, CA (US); Jiang Zhu, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 820 days.

(21) Appl. No.: 13/924,913

(22) Filed: Jun. 24, 2013

(65) Prior Publication Data
US 2014/0378066 A1 Dec. 25, 2014

(51) Int. Cl.
| | | |
|---|---|---|
| *G08B 1/08* | (2006.01) | |
| *H04W 24/08* | (2009.01) | |
| *H04W 48/04* | (2009.01) | |
| *H04W 24/04* | (2009.01) | |

(52) U.S. Cl.
CPC ............ *H04W 24/08* (2013.01); *H04W 24/04* (2013.01); *H04W 48/04* (2013.01)

(58) Field of Classification Search
None
See application file for complete search history.

(56) References Cited

U.S. PATENT DOCUMENTS

| | | | | |
|---|---|---|---|---|
| 6,331,817 | B1* | 12/2001 | Goldberg | G08B 13/1427 340/10.1 |
| 7,107,009 | B2* | 9/2006 | Sairanen | G06F 3/0481 340/572.1 |
| 7,840,543 | B2 | 11/2010 | Guiheneuf et al. | |
| 8,154,401 | B1* | 4/2012 | Bertagna | H04W 64/00 340/539.13 |
| 2008/0083982 | A1* | 4/2008 | Kelley | G06F 21/88 257/722 |
| 2009/0034591 | A1* | 2/2009 | Julian | H04W 4/206 375/220 |
| 2009/0204348 | A1* | 8/2009 | Davis | H04W 4/02 702/60 |
| 2010/0039266 | A1* | 2/2010 | Faris | G08B 21/24 340/572.4 |
| 2010/0130167 | A1* | 5/2010 | Bennett | H04L 63/30 455/411 |
| 2010/0134280 | A1* | 6/2010 | Caetano Pereira | G01S 5/0027 340/539.17 |

(Continued)

*Primary Examiner* — Curtis King
(74) *Attorney, Agent, or Firm* — Edell, Shapiro & Finnan, LLC

(57) ABSTRACT

Techniques are presented herein to provide human mobility pattern based modeling and tracking of a group of network enabled user devices associated with the same person. An association is made, at a tracking device, between a plurality of user devices and a user. Location information for each of the plurality of user devices is derived through network activity of the plurality of user devices. Locations for the plurality of user devices are derived from the location information. One or more predetermined user mobility pattern rules are applied to the plurality of user devices. User anomalies are detected when the tracked locations indicate that one or more of the plurality of user devices has violated one or more the predetermined user mobility rules.

20 Claims, 13 Drawing Sheets

(56) References Cited

U.S. PATENT DOCUMENTS

| | | | |
|---|---|---|---|
| 2010/0250348 A1* | 9/2010 | Dunbar | G06Q 30/0241 |
| | | | 705/14.4 |
| 2011/0078332 A1 | 3/2011 | Poon | |
| 2012/0311659 A1 | 12/2012 | Narain et al. | |
| 2013/0107728 A1 | 5/2013 | Zhu et al. | |
| 2013/0147617 A1* | 6/2013 | Boling | G08B 21/18 |
| | | | 340/431 |

* cited by examiner

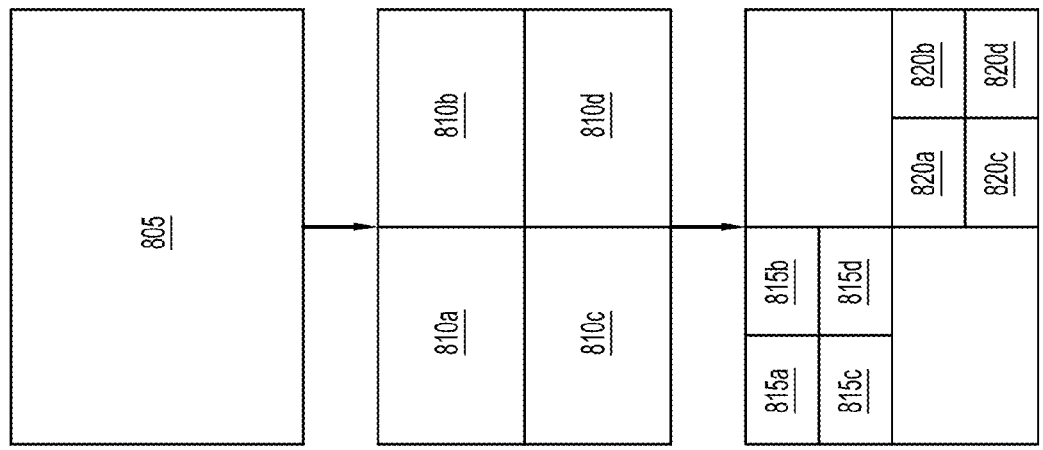
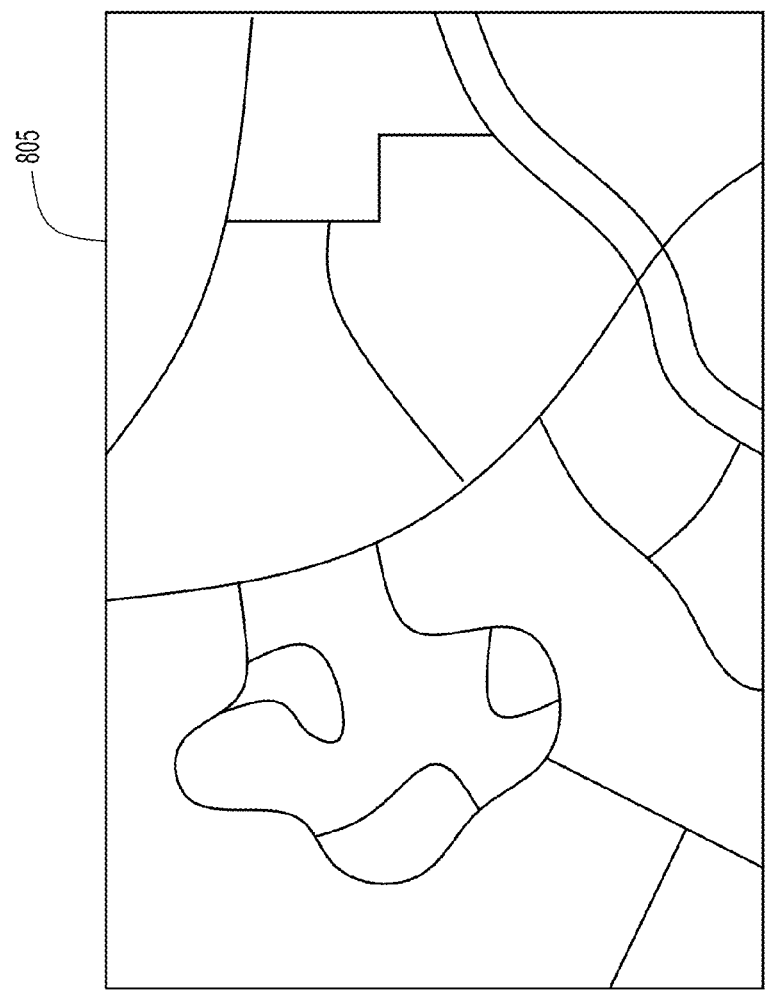
FIG. 8

```
                CREATE ROOT PARTITION WITH ROOT->REGION = ENTIRE COVERAGE AREA;
        905     ASSIGN ALL LOCATION-TUPLES TO ROOT;
                PARTITIONSIMPLE( ROOT );
                PARTITIONSIMPLE( PARTITION CP ) {                           912
                    IF( cp->LOCATION-TUPLES <= THRESHOLD ) THEN RETURN;
                    ADD 4 CHILD PARTITIONS TO cp;
                    i = 1;                          914
                    FOR EACH CHILD PARTITION P IN cp
                        SET p->REGION = QUADRANT I OF cp->REGION;
                        SET P->LABEL = CONCATENATE( cp->LABEL,i );
910                     FOR EACH LOCATION-TUPLE LT IN cp              918
        916                 IF (GT LIES WITHIN p) THEN ASSIGN LT TO p;
                        END
                        PARTITIONSIMPLE(p );
                        i = i + 1;
                    END                     920
                }
```

HUMAN MOBILITY RULE-BASED DEVICE LOCATION TRACKING

TECHNICAL FIELD

The present disclosure relates to tracking network enabled user devices, and in particular, applying location-based human behavior modeling to the tracking of user devices.

BACKGROUND

Bring Your Own Device (BYOD) has become an important trend in enterprise computing environments, and never before have so many different types of devices been brought into the work place. Furthermore, the variety of "smart" wireless devices associated with users able to actively transfer and receive data in an enterprise wireless local area network (WLAN) has greatly increased.

The inclusion of BYOD devices into the workplace and existing WLANs require the networks to provide better, more secure, stable and intelligent services to different types of business related devices and applications. The traditional "one employee one device" model is outdated. Furthermore, no longer can a single user identity be uniquely mapped to a single network enabled user device. Instead, it is more common to see a one-user-to-many-devices relationship in today's WLAN environment. The one-to-many human/device relationship adds new dimensions to existing data mining and analytics in mobility on a per device basis.

BRIEF DESCRIPTION OF THE DRAWINGS

FIG. 8 is an illustration of location partitioning for location-based human behavior modeling and tracking of user devices.

FIG. 9 shows pseudo code configured to perform location partitioning for location-based human behavior modeling and tracking of user devices.

DESCRIPTION OF EXAMPLE EMBODIMENTS

Overview

Techniques are presented herein to provide human mobility pattern-based modeling and tracking of network enabled user devices associated with the same user. An association is made, at a tracking device, between a plurality of user devices and a user. Location information for each of the plurality of user devices is derived through network activity of the plurality of user devices. Locations for the plurality of user devices are derived from the location information. One or more predetermined user mobility pattern rules are applied to the plurality of user devices. User anomalies are detected when the tracked locations indicate that one or more of the plurality of user devices has violated one or more the predetermined user mobility rules.

Example Embodiments

Figure 1:
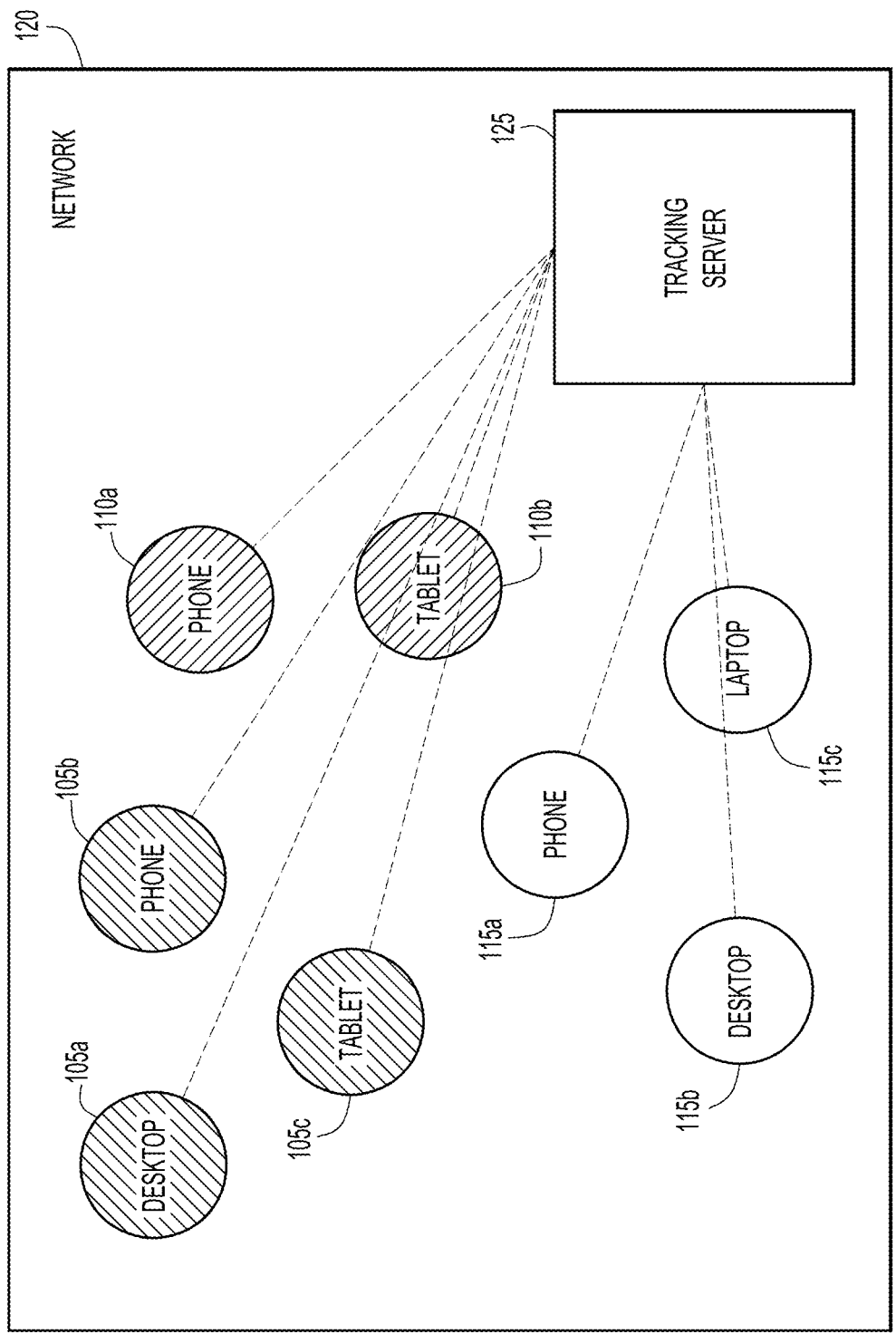
FIG. 1 illustrates an example of a network environment configured to perform location-based human behavior modeling and tracking of multiple network enabled user devices associated with the same user.

Depicted in FIG. 1 is a functional diagram for a location-based human behavior modeling and tracking system presented herein. Specifically, a plurality of network enabled user devices 105a-c, 110a,b and 115a-c log into network 120. Once logged into network 120, the user devices 105a-115c are tracked by tracking server 125 according to a human behavior model configured to detect human behavior anomalies that can used to implement device and network applications, such as applications that ensure device and network security. Tracking server 125 is illustrated as a standalone device, but real-world implementations of the server may be embodied in one or more devices, including one or more server farms, or one or more applications running in a cloud/data center environment.

A portion of the tracking functions performed by tracking server 125 involve making an association between each of devices 105a-115c and a corresponding user having access to network 120. This association is represented in FIG. 1 through the shading applied to user devices 105a-115c. Accordingly, devices 105a-c, which all belong to a first user are shaded in the same way. Similarly, devices 110a and b, which belong to a second user, are shaded in the same way, as are devices 115a-c, which belong to a third user.

Figure 2:
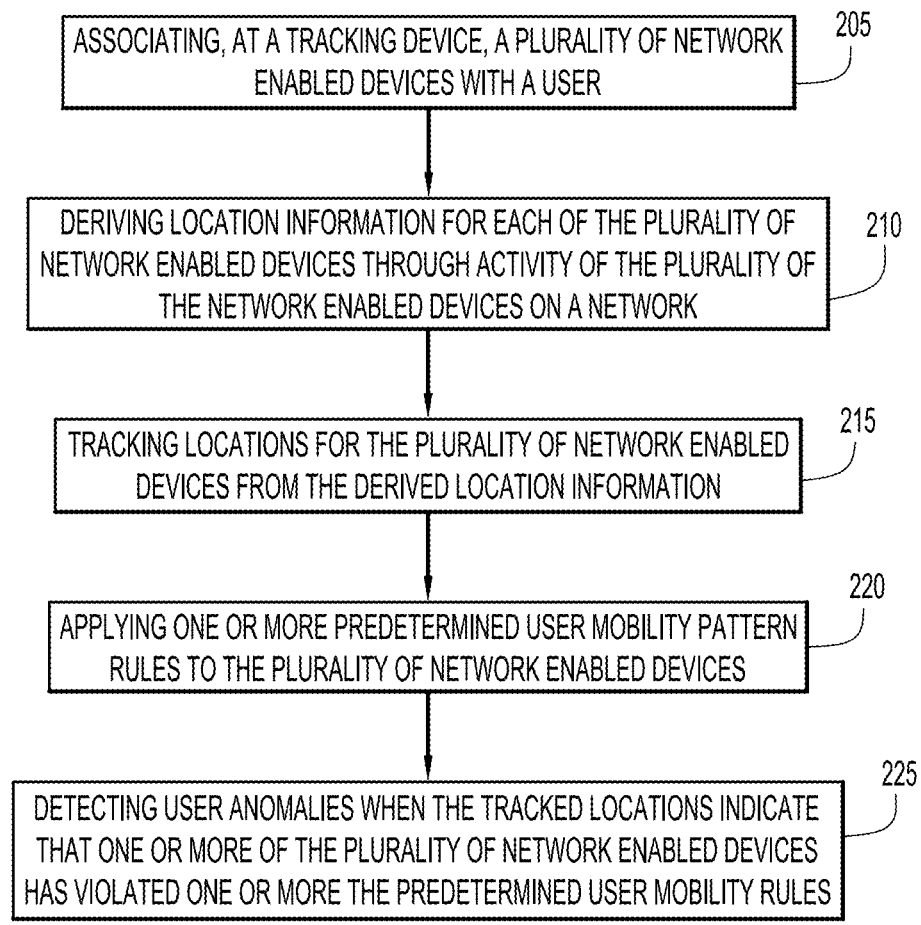
FIG. 2 is a flowchart illustrating a process for performing location-based human behavior modeling and tracking of user devices.

With reference now made to FIG. 2, depicted therein is a flowchart 200 illustrating a method of providing human behavior modeling and tracking. The process begins in operation 205 where an association is made between a plurality of network enabled user devices and a user. For example, if the same user name is used to authenticate two or more devices on a network, it may be determined that the two or more devices are associated with the same user. According to other examples, an association may be made based upon a history of location information. For example, if two devices have a history of being located in the same location, and moving to other locations at the same time, it may be determined that the devices are associated with the same user. Additional methods of associating devices with user will be described in more detail below with reference to FIGS. 10-12.

In operation 210, location information for each of the plurality of user devices is derived from activity of the plurality of user devices on the network. For example, the location of a device may be determined from the network access point used to access the network. This network access information may be used to determine the location of the corresponding device. Detailed descriptions of how location information is derived are provided below in reference to FIGS. 8 and 9.

In operation 220, one or more predetermined user mobility pattern rules are applied to the plurality of user devices. In operation 225, anomalies are detected when the tracked locations indicate that one or more of the plurality of user devices has violated one or more of the predetermined user mobility rules.

Figure 3:
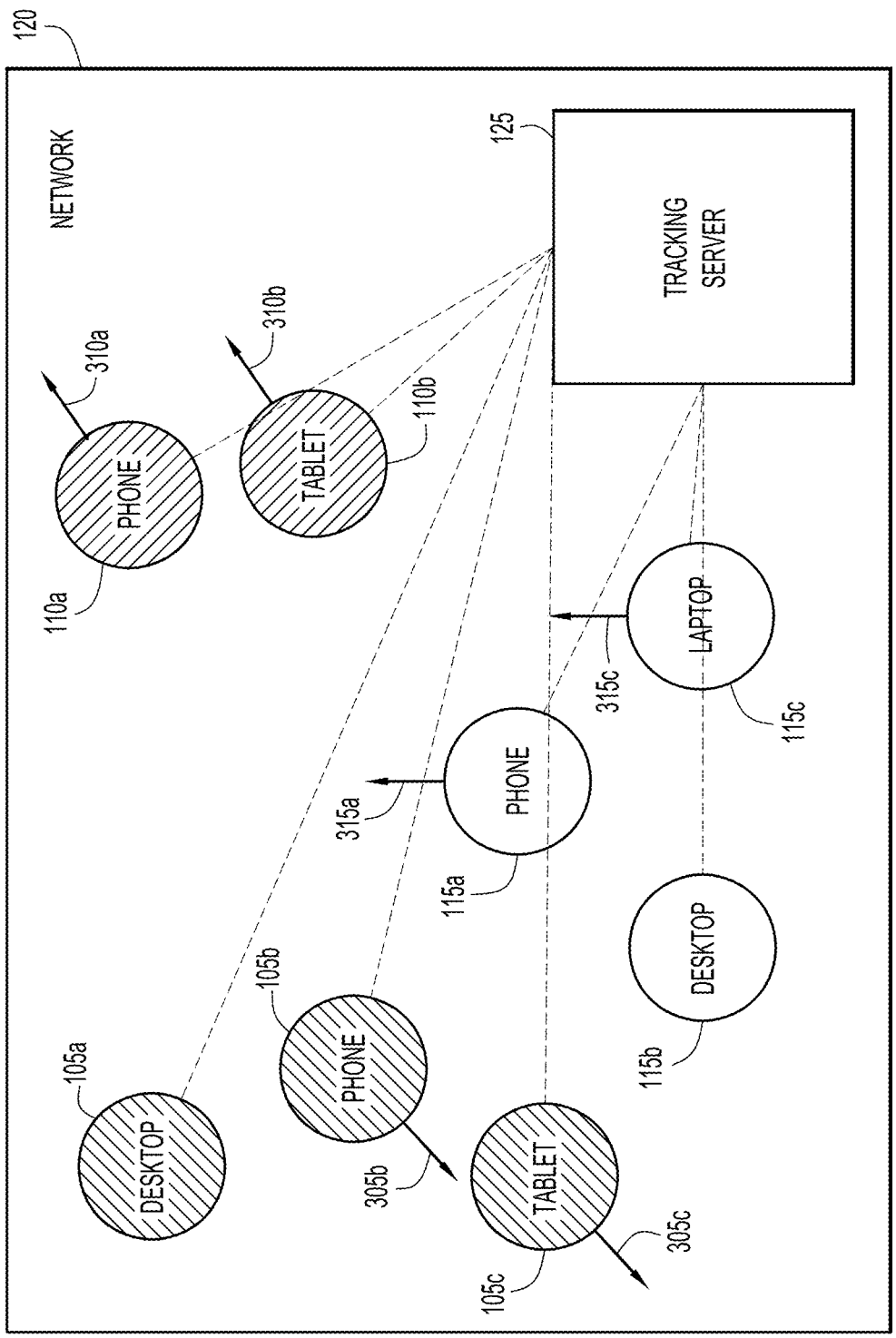
FIG. 3 shows a network environment illustrating two example user mobility pattern rules.

With reference now made to FIG. 3, depicted therein are two examples of user mobility pattern rules. The network environment shown in FIG. 3 is analogous to the network environment depicted in FIG. 1, and therefore, like reference numerals have been used to indicate like elements. Accordingly, user devices 105*a-c* are user devices that have been associated with a single user, and therefore share the same shading as was used in FIG. 1. Similarly, user devices 110*a-c* are associated with another user, and user devices 115*a-c* are associated with a third user.

The first user mobility pattern rule illustrated in FIG. 3, states that when multiple devices are associated with a user, the moving devices are located with the user. Accordingly, because devices 105*b* and 105*c* are moving as illustrated by motion vectors 305*b* and 305*c*, respectively, these devices should be located with their associated user. Similarly, devices 110*a* and 110*b*, which are moving as indicated by their motion vectors 110*a* and 110*b*, respectively, are located with their user. Finally, devices 115*a* and 115*c* should be located with their associated user as they are moving, as indicated by motion vectors 310*a* and 310*b*, respectively. This first user mobility pattern rule specifically addresses situations where a mobile device, such as a laptop or Smartphone, is tracked as, or determined to be, moving. This first rule states that the moving device is with the user, as someone else should not be carrying off another user's laptop or Smartphone. While there may be exceptions to this rule, for most situations, this rule should apply.

The application of the first user mobility pattern rule may be used to more intelligently provide services to the devices associated with the user. For example, the first user mobility pattern rule says that moving devices are located with their associated user. Accordingly, services, such as messaging services, may be pushed only to the devices currently in the possession of the user. By pushing services only to the device currently in the possession of the user, network bandwidth savings may be achieved. Improved network performance may also be achieved.

Additionally, Quality of Service (QoS) application service levels can be determined and balanced based on whether or not a user is currently in possession of a specific device. QoS applications are services for which a baseline level of service is guaranteed. For example, Internet telephony applications require a certain level of performance in order to function properly. Accordingly, QoS applications are guaranteed a minimum level of network resources. But, if it can be determined that a user is not currently in possession of a device running a QoS application, the minimum level of services provided to the application can be lowered, possibly even lower than the normally guaranteed level.

The second user mobility pattern rule illustrated in FIG. 3 states that when one or more of the user devices associated with a single user are moving, the one or more devices move in the same direction. Said slightly differently, one or more devices associated with a user cannot simultaneously move in two different directions. When this rule is applied to a single user, it makes perfect sense that a single device cannot move in two directions simultaneously. When applied to two or more devices, the rule states that two mobile devices, if they are moving, should both be with their associated user. For example, it would be within this rule for a user to take their smartphone home and leave their laptop at their desk, as this would mean only one device is moving, and that one device is moving in a single direction. Similarly, it would be within the rule if the user took both their laptop and their cell phone home, as both devices would be moving with each other, and therefore, moving in the same direction.

Figure 4:
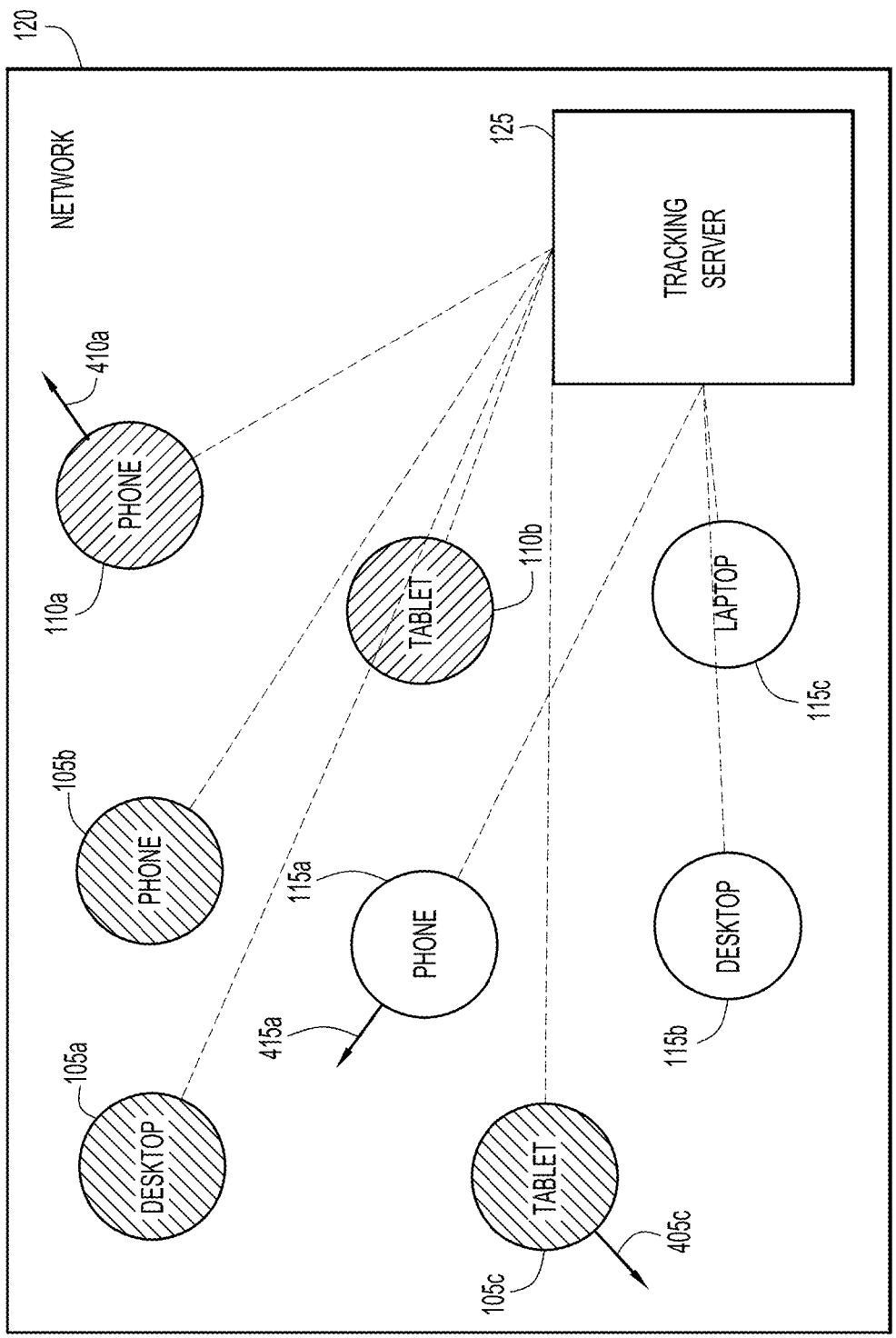
FIG. 4 shows a network environment illustrating how the first of the two example user mobility pattern rules may be violated.

Turning to FIG. 4, illustrated therein are situations which may violate the first rule described above with reference to FIG. 3. Once again, like reference numerals have been used to refer to like elements. As illustrated in FIG. 4, user device 105*c* is moving as indicated by motion vector 405*c*. In and of itself, this is not a violation of the rule that when a device is moving, the device is located with the user. But, if additional network activity indicates that the user is not located with user device 105*c*, this would indicate a violation of rule 1. For example, at the same time user device 105*c* is moving, network activity at device 105*a* may indicate that the user associated with device 105*c* is located with device 105*a*. Specifically, the user may be logging device 105*a* into network 120. Because tracking server 125 would be aware of both the motion of device 105*c*, and the network activity of device 105*a*, tracking server 125 may determine that the first user mobility pattern rule has been violated, and therefore, an anomaly has occurred.

Once this anomaly has been detected, the tracking server can respond to remedy the anomaly. For example, if the tracking server is confident that the user associated with devices 105*a* and 105*c* is located at the same location as device 105*a*, tracking server 125 may cut-off (terminate) network access to device 105*c*. Similarly, tracking device 125 may send a message, such as an email, instant message, or short message service (SMS) message, to the user through device 105*a* indicating to the user that someone else may be in possession of device 105*c*. On the other hand, if tracking server determines that the user is located with device 105*c*, network access may be terminated for device 105*a*, or messages may be sent to device 105*c* indicating that another user is in possession or attempting to use device 105*a*.

Similarly anomalies may be detected for devices 110*a-b* and 115*a-c*, respectively, depending on the network activity associated with these devices.

Figure 5:
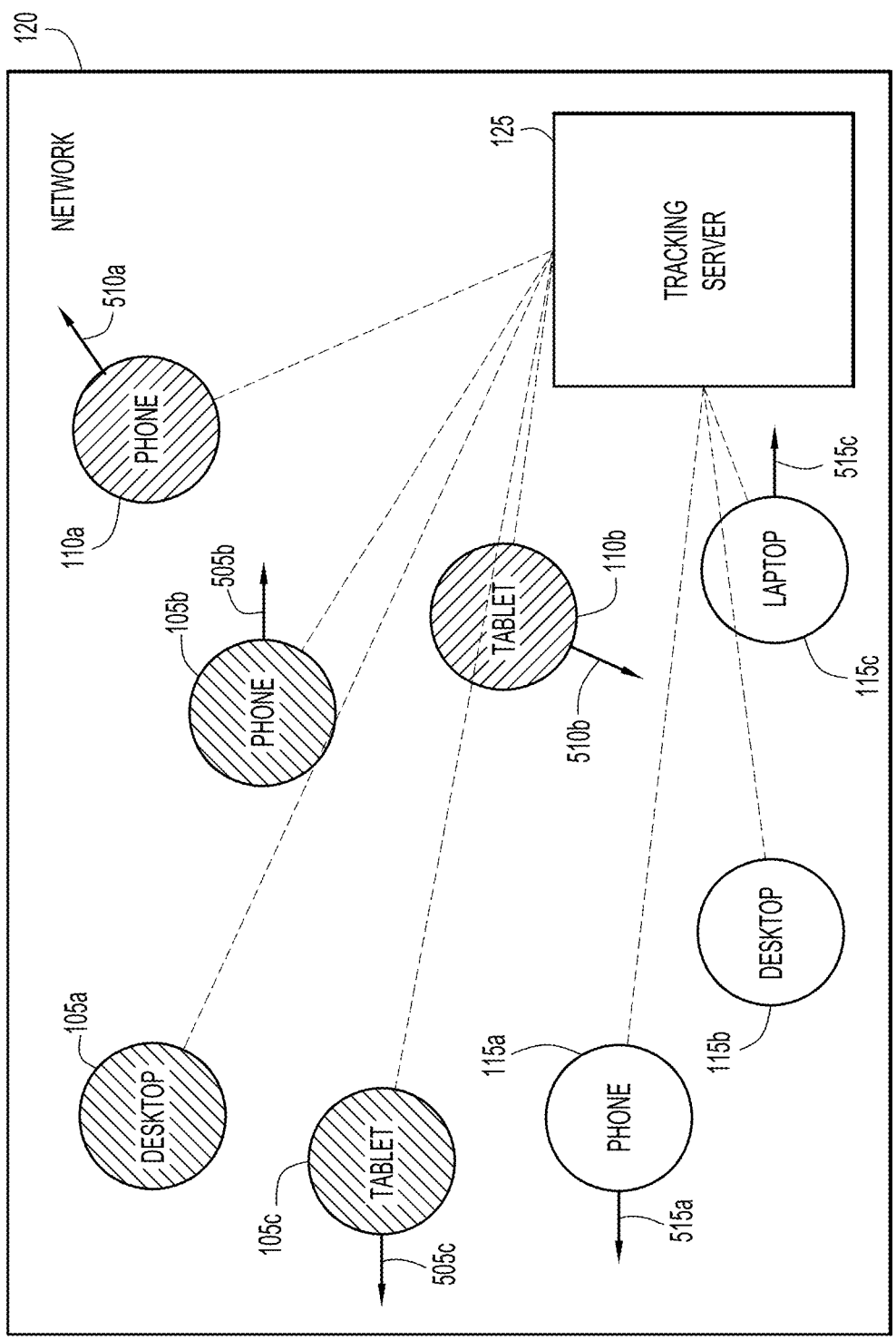
FIG. 5 shows a network environment illustrating how the second of the two example user mobility pattern rules may be violated.

Turning to FIG. 5, illustrated therein are situations which may violate the second user mobility pattern rule described above with reference to FIG. 3. As discussed above, the second rule states that when one or more of the user devices associated with a single user are moving, the one or more devices move in the same direction. For example, when a user goes to a meeting, the user may bring both their laptop and their smartphone with them, but when doing so, the two devices should simultaneously move in the same direction. Similarly, when a user goes home for the day, the user may bring their smartphone, tablet and laptop with them. At other times, a user may simply attend a meeting with nothing more than their smartphone, but if they do, their laptop and tablet should remain stationary. When two or mode mobile devices associated with a single user move in different directions, it serves as an indication that one or more of the mobile devices is in the hands of an unauthorized user, and therefore, is a violation of the second rule.

As illustrated in FIG. 5, each set of devices associated with a different user is experiencing a violation of the second rule. For devices 105*a-c*, devices 105*c* and 105*b* are moving in different directions as indicated by motion vectors 505*b* and 505*c*, respectively. Similarly, devices 110*a* and 110*b* are simultaneously moving in different directions, as indicated by motion vectors 510a and 510b, respectively. Finally, devices 115a and 115c are moving in different directions as indicated by motion vectors 515a and 515c. Accordingly, an anomaly will be detected for each of these groups of devices.

In response to the detected anomalies, the tracking server 125 may take some form of corrective action. For example, messages may be sent to one or more of the devices associated with the user to alert the user that an anomaly has been detected. According to another example, network access maybe denied to one or more of the user devices associated with the user whose devices experienced the anomaly. Furthermore, a combination of messages and limitations on network access may be implemented in response to the detection of an anomaly.

Using devices 105a-c as an example, it may not be clear which of tablet 105c and phone 150b is located with their associated user. Accordingly, it may not be possible to determine which device should have its access to network 120 denied. Therefore, tracking server 125 may disable/terminate Internet access to both phone 105b and tablet 105c, while sending a message to desktop 105a. Specifically, track server 125 may determine which device should receive the message based on the type of devices, as illustrated by devices 105a-c. Because device 105a is a desktop computer, tracking server 125 may determine that desktop 105a is the least likely of devices 105a-c to be in the hands of an unauthorized user. Accordingly, tracking server 125 sends a message to device 105a and interrupts network access for devices 105b and 105c.

Figure 6:
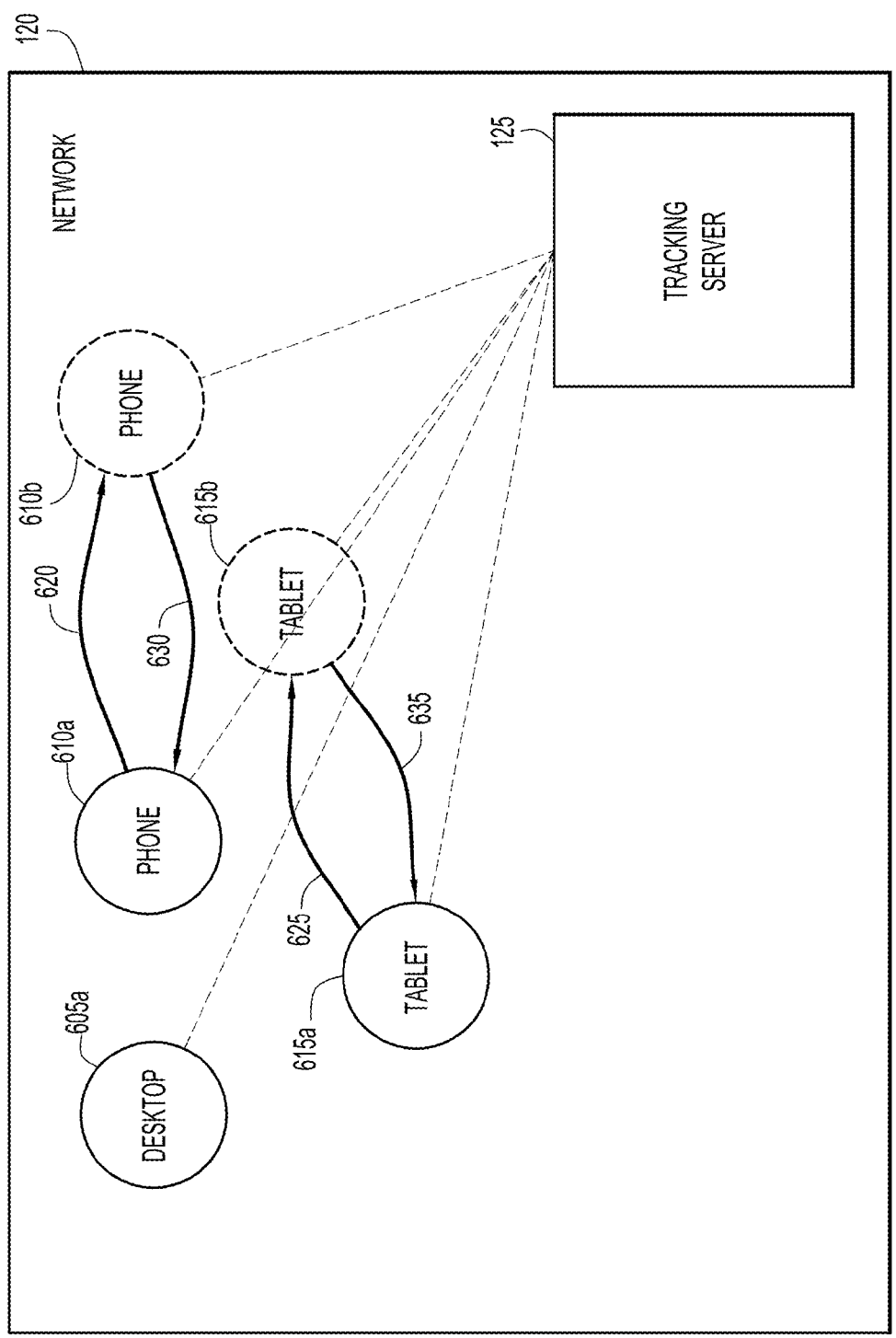
FIG. 6 shows a network environment illustrating a third example user mobility pattern rule.

With reference now made to FIG. 6, illustrated therein is a third user mobility pattern rule. Specifically, the third rule states that when devices are moved together in a group from a first location to a second location, the devices shall leave the second location together. According to one specific example, when two or more devices leave a user's main location, such as the user's office, the two or more devices will return to the office together. This rule is illustrated through devices 610a and 615a of FIG. 6. Specifically, the user associated with devices 605a, 610a and 615a takes devices 610a and 615a from the user's main location, such as an office to another location, such as a conference room for a meeting. The movement of the devices 610a and 615a to the office is illustrated through arrows 620 and 625, respectively. Furthermore, the time devices 610a and 615a are located at the conference room are represented through elements 610b and 615b. In order to comply with the third user mobility pattern rule, both device 610b and 615b should return to the user's office together, as illustrated through lines 630 and 635.

Figure 7:
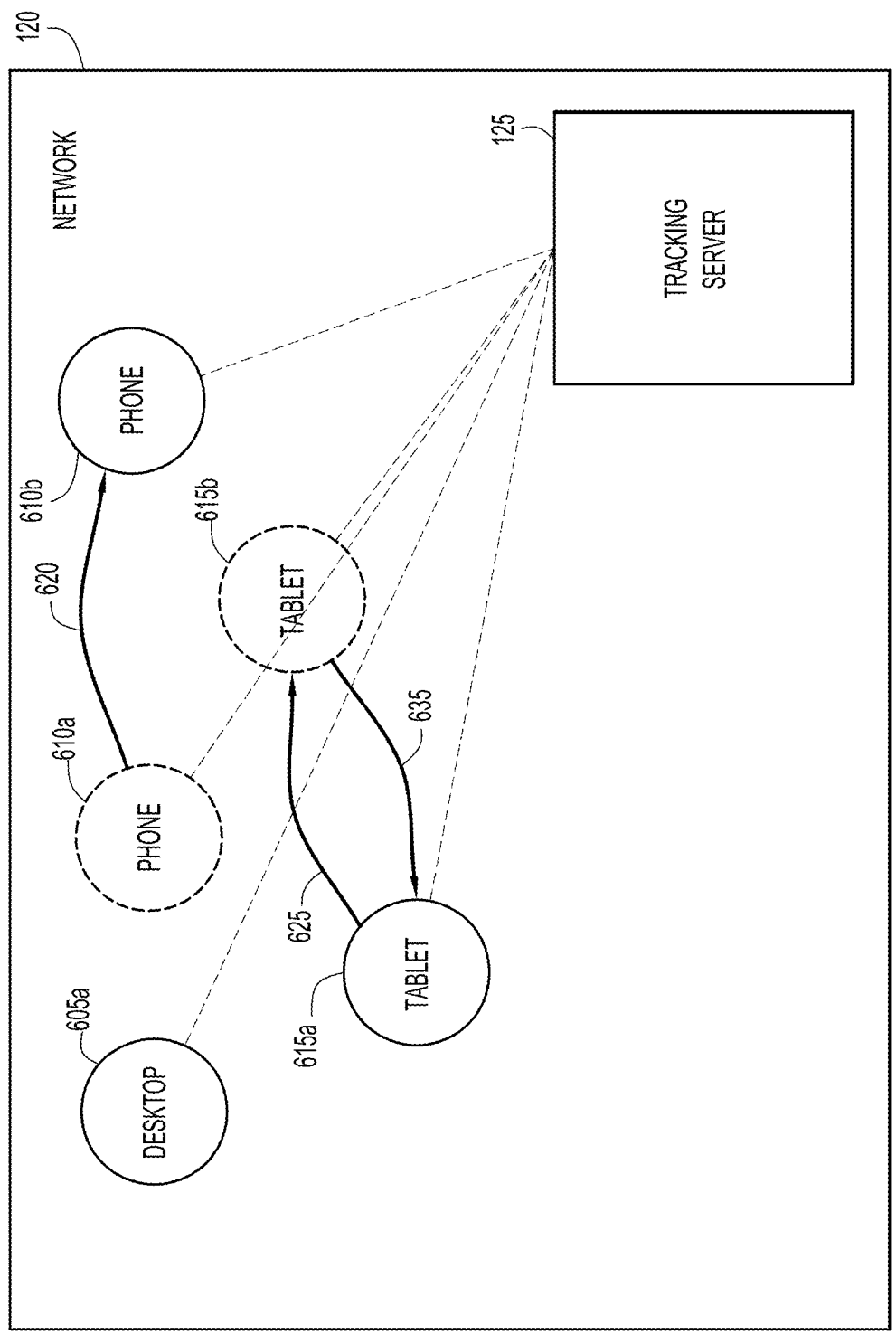
FIG. 7 shows a network environment illustrating how the third user mobility pattern rule may be violated.

With reference now to FIG. 7, depicted therein is a violation of the third user mobility pattern rule. Specifically, device 610b never returns to the user's office in FIG. 7, and therefore, there is no line corresponding to line 625 of FIG. 6. Because the failure of device 610b to return to the user's office is a violation of the third user mobility pattern rule, the tracking server 125 registers the failure of device 610b to return the user's office as an anomaly, and may take further action in response to the anomaly. For example, the failure of device 610b to return to the user's office may serve as an indication that the user has forgotten their phone. Accordingly, tracking server 125 may send the user associated with device 610b a message telling the user that they have forgotten their phone 610b. The message may be sent to both device 605a and 615a. On the other hand, if the tracking server 125 determines that device 615b has moved somewhere other than the user's office, the message may be sent only to device 615a.

With reference now to FIG. 8, depicted therein is an illustration of density-based location tag partitioning used to track the location of network enabled user devices, such as user devices 105a-c, 110a-c and 115a-c of FIGS. 1 and 3-5. Specifically, user and device location tracking may be a resource intensive endeavor. In order to alleviate some of the resource demands, density-based location tag partitioning may be implemented by a tracking server, such as tracking server 125 of FIGS. 1 and 3-7.

In general, location tracking of a device will determine the location of a device within a specific partition. For example, a network may allow for a tracking server to locate a user device within a certain area, such as locating a user within 1 square meter, based on the network activity of a user device. Specifically, this location may be recorded as a tuple, which is a set of coordinates as well as a time value. For example, a user's location may be determined in two spatial dimensions using a tuple comprised of an x-coordinate, a y-coordinate, and a time value. Similarly, a user may be determined in three spatial dimensions using an x-coordinate, a y-coordinate, a z-coordinate, and a time value. These coordinates may then be translated into a location based on a grid structure of the areas covered by the network.

According to a first example, a network coverage area may be divided into equal sized partitions. For example, an entire office floor may be divided into 1×1 square meter grids, with each grid being given a label. Then, all location tuples falling within a certain partition are replaced by the label of that partition. This method of partitioning is very straightforward to implement and makes comparisons between multiple devices' mobility traces extremely simple.

Equal-sized partitions may also result in over- and under-granularization. In the case of over-granularization, in areas where people rarely go to, such as storage rooms, unoccupied office spaces, unoccupied floors, and others, these areas may be split into a large number of partitions, requiring significant resources to track devices in these areas, even if there is a small chance of more than a single device being present in the areas. On the other hand, areas regularly frequented by users will have a large number of places of interest, (e.g., break rooms, rest rooms and other common social places), and utilizing a low granularity of partitioning could lose important information regarding visits to each individual place of interest within the partition.

In order to account for over- and under-granularization, a density-driven hierarchical partitioning method may be implemented. In a density-driven hierarchical partitioning method, the granularity of partitioning for an area is determined by the frequency of visits to that area, based on observed geo-traces of a user or a group of users. The process begins by treating the entire world surface as a single partition, as illustrated by map area 805 in FIG. 8. The area 805 is then recursively divided into child partitions by splitting it into four quadrants 810a-d with a north-south line and an east-west line. Further division of a partition is halted when the number of tuples recorded within that partition falls below a density threshold. According to the example of FIG. 8, quadrant 810a undergoes further partitioning, forming quadrants 815a-d, as does quadrant 810d, forming quadrants 820a-d. On the other hand, quadrants 810b and 810c fail to reach the threshold number of tuples, and therefore, do not undergo further partitioning.

The resulting partitioned area may be considered a quadtree in which each partition is given a label. Specifically, each partition within the quad-tree may be given a label which uses a parent partition's label as a prefix appended thereto. For example, if the reference numerals of FIG. 8 are used as the labels, the label for partition 820d may be given as "805/810d/820d." Specifically, the label for 820d has its parent label "810d" appended to it, and the parent label for 810d, "805", is further appended to the label. Using this density-driven partitioning, both under-granularization and over-granularization may be avoided.

Turning to FIG. 9, depicted therein is pseudo code 900 for a recursive algorithm for partitioning a region according to a density-driven hierarchical partitioning method. Specifically, the pseudo code 900 first partitions the "root" which would be the entire service area, such as area 805 of FIG. 8. Portion 910 of the pseudo code is used to perform the partition through the "PartitionSimple" method. Specifically, the "If" statement of line 912 determines whether or not the number of tuples in the "root" partition is less than the predetermined threshold for partitioning. If the number of tuples is less than the threshold, the process ends without partitioning the "root" partition. If the number of tuples is greater than the threshold, four child partitions are added to the "root" partition at 914. Portion 916 then performs the partitioning analysis for each child partition created in 914, setting the label for each child partition at 918 and recursively calling the "PartitionSimple" function for each child partition at 920. Once no more child partitions are found with a number of tuples greater than the threshold value, the execution of the partitioning pseudo code will end.

In addition to tracking location information and performing partitioning, a tracking server, such as tracking server 125 of FIGS. 1 and 3-7, may also determine time and movement information for each device. For example, to determine movement, or direction of displacement, the tracking server will determine an angle of the directional vector for two or more subsequent locations of a user device. For example, the direction is "0°" if the direction vector points "North" and "90°" if the direction vector points east. Furthermore, similar to partitioning of location described above, direction may also be partitioned.

To further track user devices, the tracking server may also track a time of day feature for each user device. The time of day feature can be considered a partition of the time stamps applied to network activity. For example, if the 24 hours in a day are partitioned into segments of equal duration, each timestamp for a user device may placed into one of these partitions.

Additionally, a consecutive sequence of identical location-tags, which indicates that the user device is not moving or only moving inside the current partition, may be replaced with a single tag. The time spent at that location is converted to a pause duration which will have a discrete value similar to the time of day feature.

With the location, direction, time of day, pause duration, and time stamp all determined, user devices may be tracked using a series of feature vectors. A feature vector may be represented as a vector comprised of a plurality of data values, such as:

$$\vec{f}_i = \{LTag_i, Dir_i, TOD_i, PD_i, TS_i\};$$

where LTag is the location tag for a user device at a particular time i, DIR is the direction for a user device at a particular time i, TOD is the time of day for a user device at a particular time i, PD is the pause duration for a user device at a particular time i, and TS is the time stamp for a user device at a particular time i. According to some examples, the DIR feature and the PD feature are mutually exclusive, meaning when the Dir value is present the PD value is not, and vice versa. With the feature vectors in place, pattern recognition algorithms may be applied to the tracked information to extract the mobility pattern for grouping.

In the examples described above in reference to FIGS. 1 and 3-7, it has been assumed that the user devices are associated with a user based upon a common user login. Yet, not all network systems require a user to login into the network to receive network services. Accordingly, FIGS. 10-13 present additional methods through which devices may be grouped and determined to be associated with the same user.

Figure 10A:
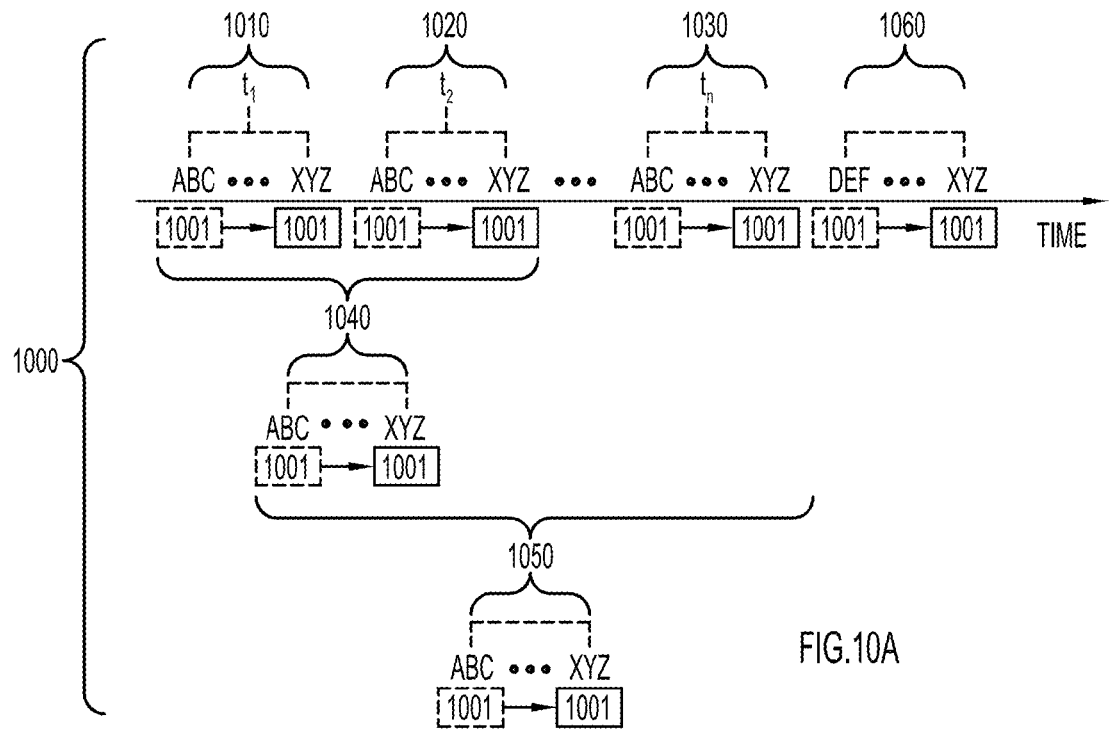
FIGS. 10A and 10B are illustrations of examples of tracking user devices and grouping the user devices according to their associated human users.
Figure 10B:
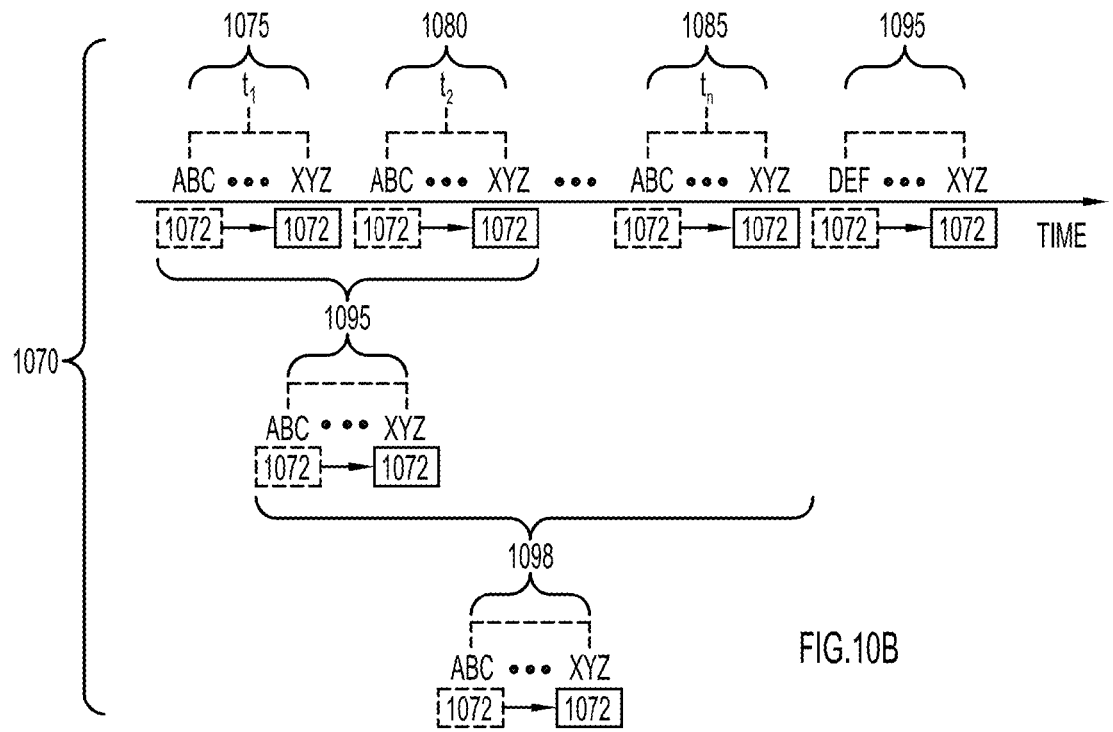

A first method of grouping devices is now described in conjunction with FIGS. 10a and 10b. Specifically, if location tags are found which share the same pattern of movement, then the devices associated with those tags can be determined to belong to the same user. Specifically, a T-Pattern model, such as models 1000 and 1070 of FIGS. 10a and 10b, respectively, is applied to the tags for user devices, and devices with similar T-Pattern models may be determined as belonging to the same user. Additionally, T-Patterns may be used to develop a model for a user's behavior. If a device fails to follow the model constructed from the device's T-Patterns, that deviant behavior may be deemed an anomaly.

A T-Pattern comprises two location tags with a time interval in between. The first location can be considered a starting location, the second location can be considered an ending location, and the time interval in between may be considered the time it takes to travel from the starting location to the ending location. The starting and ending location may be determined from the location tag of two feature vectors for a single device while the time interval value may be determined from the time stamp value of the two feature vectors. A T-Pattern model is made up of one or more T-Patterns that define the movement (and pauses) usually taken by a specific device. In order to determine T-Pattern models, location labels are searched for statistically significant pairs of recurring tags. Statistical significance refers to starting and ending location tags with a corresponding time interval between in which there is a strong statistical correlation to the starting location, ending location, and time interval with another pair of tags.

Take, for example, T-Pattern model 1000 for user device 1001 of FIG. 10A. A first pair of tags 1010 for user device 1001 begins at location "ABC" and ends at location "XYZ," with a time interval of t1 in between. A second pair of tags 1020 for user device 1001 indicates that the device once again begins at location "ABC" and ends at location "XYZ," with a time interval of t2 between them. If the time intervals t1 and t2 are sufficiently similar in duration, the first pair of tags 1010 and the second pair of tags 1020 would be considered statistically significant. Because these two tags are considered statistically significant, the two pairs of tags 1010 and 1020 are collapsed into a single pair of tags 1040. Pair 1040 is then compared for significance with the rest of the tags for device 1001. For example pair 1040 may be compared to pair 1030. If these two pairs are found to be statistically significant, they will be collapsed into pair 1050.

On the other hand, tags 1060 would not be statistically significant with tags 1050 because tags 1060 begin at "DEF" not "ABC." Accordingly, tags 1060 would not be collapsed to form a single pair of tags with tags 1050. Once all of the statistically significant pairs of tags for device 1001 are collapsed together, the remaining tags, or T-Patterns, will form the T-Pattern model for device 1001. For example, for device 1001, the T-Pattern model would include tags 1050 and tags 1060.

Once determined for each device, T-Pattern models for different devices may be compared to determine whether or not two devices are associated with the same user. For example, T-Pattern model 1070 for device 1072 of FIG. 10B is very similar to T-Pattern model 1000 for device 1001 of FIG. 10A. Accordingly, it may be determined that device 1001 and device 1072 are associated with the same user.

With T-Pattern models 1000 and 1070 in place, they may be used to implement the user mobility pattern rules or detect user mobility pattern anomalies. For example, a T-Pattern that does not fall within a T-Pattern model may be considered an anomaly. Similarly, when two T-Patterns are known to be associated with a single user, then when one device diverges from its model, and another device does not, an anomaly may be determined, such as a violation of the second user mobility pattern rule described above with reference to FIGS. 3-5, above.

Figure 11:
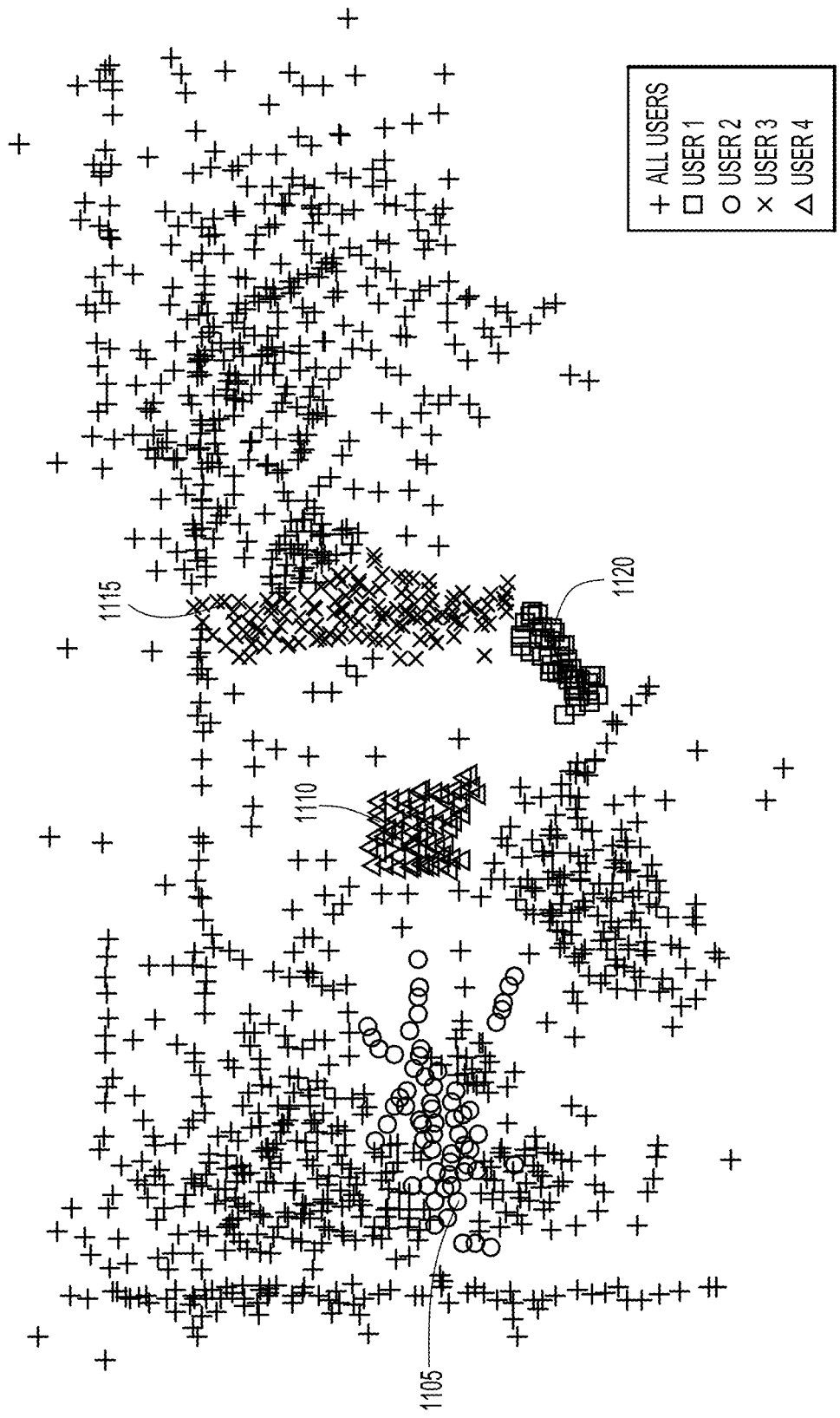
FIG. 11 is a graph illustrating cross entropy of different user devices.

With reference now made to FIG. 11, depicted therein is a graph illustrating cross entropy of different user devices' mobility area, an additional example of a method for tracking and associating user devices with a single user. Specifically, by utilizing cross entropy, computing resources can be conserved when compared with, for example, grouping through the use of T-Pattern models as described above. Specifically, cross entropy tracking removes the time stamp value from the feature vectors. With the time stamp removed, the feature vectors are reduced to a series of location information vectors. Furthermore, if it is assumed that the devices that show up in the same roaming area belong to the same user, roaming area overlap between different devices may be used to determine the likelihood those devices are associated with the same user. To evaluate the roaming area between different devices that show up in the same roaming area, cross entropy may be utilized Cross entropy is an evaluation of the similarity between two probability distributions, P and Q. The cross entropy between P and Q may be defined as:

$$H(p,q) = -\Sigma_x p(x) \log q(x);$$

where H is the cross entropy, and p(x) and q(x) are probability mass functions for discrete values of x, where x is all possible values for the distributions p(x) and q(x). Accordingly, if p and q define probability distributions for locations of two user devices, calculating H(p,q) will give a value for the overlap between the location plots for the two devices.

FIG. 11 represents a qualitative illustration of cross entropy. If the location information for all the different devices are plotted, the cross entropy is an evaluation of how much overlap there would be between the plots for two different distributions of locations. According to the example of FIG. 11, a threshold is applied to the amount of overlap. If the amount of overlap exceeds the threshold, the two devices are considered to be associated with the same user. As indicated by shaded regions, 1105, 1110, 1115 and 1120, four users were each associated with two or more devices.

Figure 12:
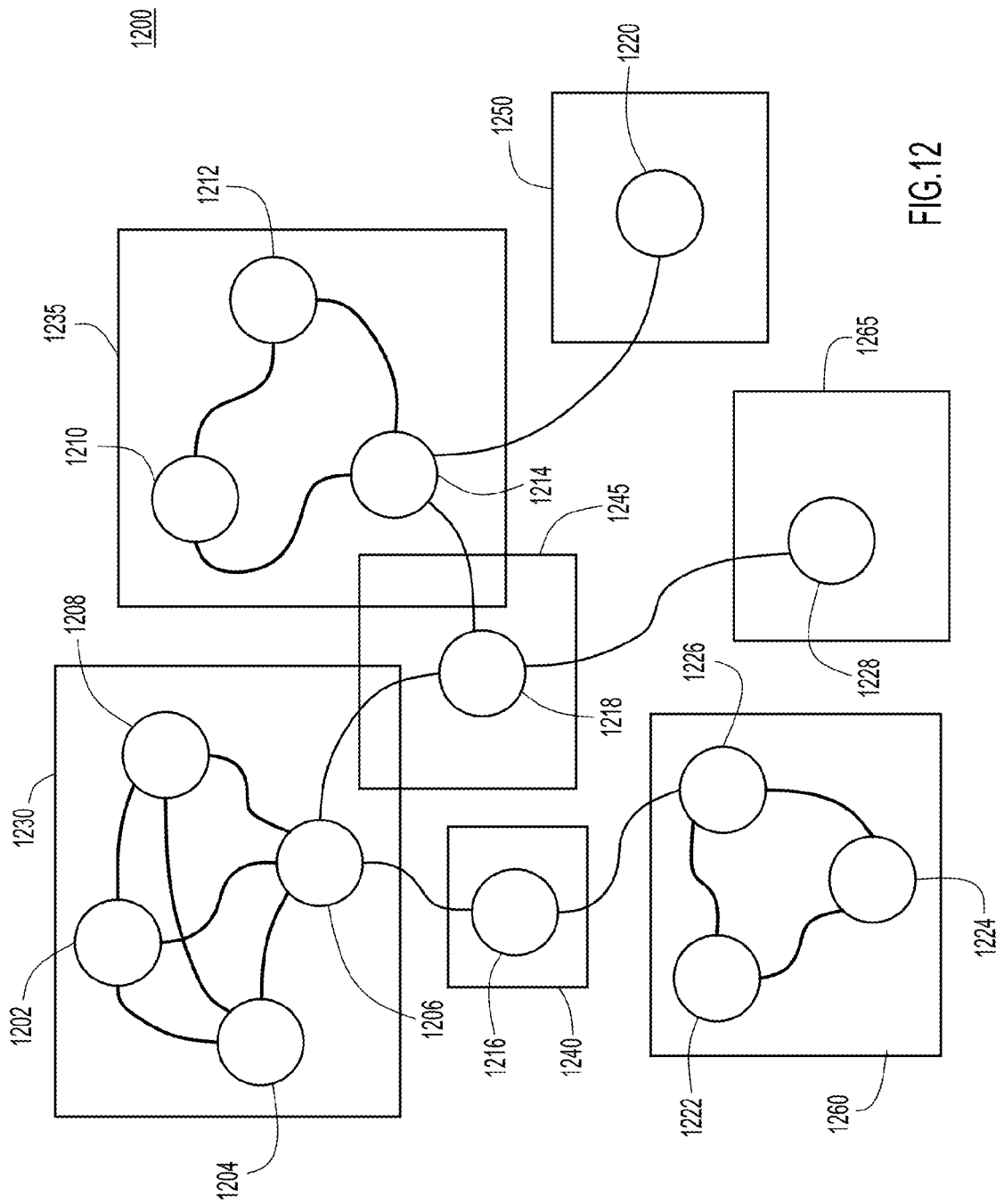
FIG. 12 is a Unidirected Weight Graph (UWG) that may be used to determine user groupings or clusterings of devices from their cross entropy.

With reference now made to FIG. 12, depicted therein is a Unidirected Weight Graph (UWG) that may be used to determine groupings or clusterings of devices from their cross entropy. Each of devices 1202-1228 are plotted relative to each other according to the cross entropy between each of the devices. Specifically, the distance between any two of devices 1202-1228 is proportional to the inverse to the cross entropy between the devices. Accordingly, the closer any two devices are to each other, the more their positions would have overlapped in a plot such as FIG. 11. The devices are then grouped according to a threshold value for the cross entropy. Accordingly each sub-graph 1230, 1235, 1240, 1245, 1250, 1260 and 1265 represents the devices associated with a single user. With the groupings in place, the model may be used to implement the user mobility pattern rules or detect user mobility pattern anomalies such as those described above with reference to FIGS. 1 and 3-5.

Figure 13:
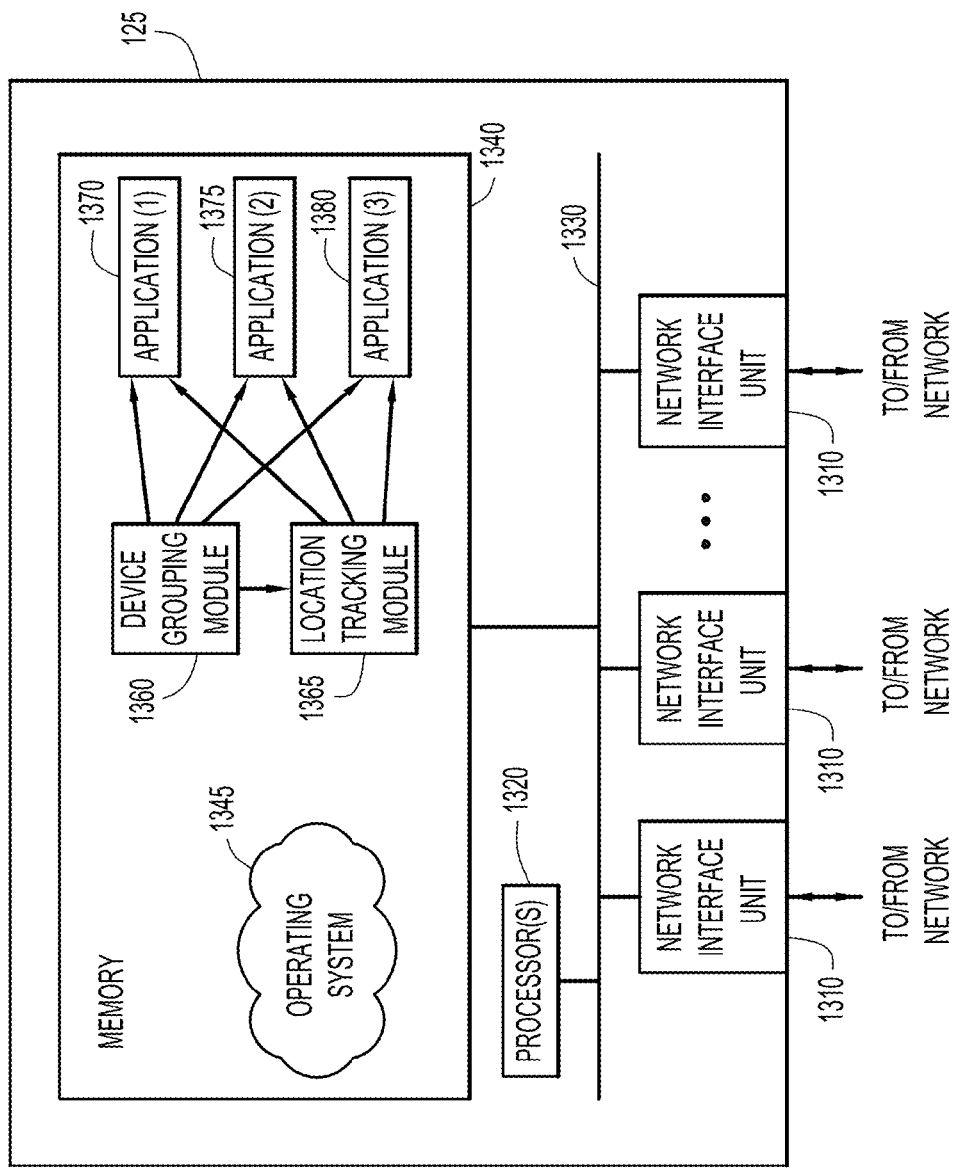
FIG. 13 is a block diagram illustrating an example tracking server configured to perform location-based human behavior modeling and tracking of user devices.

With reference now made to FIG. 13, depicted therein is a block diagram of a tracking server, such as tracking server 125 of FIGS. 1 and 3-5. The tracking server 125 comprises one or more network interface units 1310 (e.g., network interface cards) to enable communication over a network, processor(s) 1320, bus 1330, and memory 1340. The memory 1340 contains software instructions for operating system 1345, device grouping module 1360, location tracking module 1365, and application modules 1370, 1375 and 1380.

Memory 1340 may comprise ROM, RAM, magnetic disk storage media devices, optical storage media devices, flash memory devices, electrical, optical, or other physical/tangible (e.g., non-transitory) memory storage devices. The processor 1320 is, for example, a microprocessor or microcontroller that executes instructions included in o operating system software instructions 1345, device grouping module 1360, location tracking module 1365, and application modules 1370, 1375 and 1380. Thus, in general, the memory 1340 may comprise one or more tangible (non-transitory) computer readable storage media (e.g., a memory device) encoded with software comprising computer executable instructions and when the software is executed (by the processor 1320), and in particular device grouping module 1360, location tracking module 1365, and application modules 1370, 1375 and 1380, it is operable to perform the operations described herein in connection with FIGS. 1-12. Specifically, device grouping module 1360 includes software instructions that allow/cause processor 1320 to perform functions which associate user devices with users, such as the functions described with reference to FIGS. 10-12. Location tracking module 1365 includes instructions that allow/cause processor 1320 to perform functions to track the location of user devices, such as the functions described with reference to FIGS. 1-9. Application modules 1370, 1375 and 1380 include instructions that allow/cause processor 1320 to perform functions which respond to user mobility patterns and user mobility pattern anomalies, such as the functions described with reference to FIGS. 1-9.

The above description is intended by way of example only.

What is claimed is:
1. A method comprising:
    associating, at a tracking device, a plurality of network enabled user devices with a user;
    deriving location information for each of the plurality of network enabled user devices through activity of the plurality of network enabled user devices on a network;
    tracking locations for the plurality of network enabled user devices from the derived location information;
    applying one or more predetermined user mobility pattern rules to the plurality of network enabled user devices; and
    detecting a user anomaly when the tracked locations indicate that a first of the plurality of network enabled user devices has violated one or more of the predetermined user mobility rules; and transferring application services from the first of the plurality of network enabled user devices to a second of the plurality of network enabled user devices in response to detecting the user anomaly.

2. The method of claim 1, wherein associating the plurality of network enabled user devices with the user comprises determining that one or more of the plurality of network enabled user devices has logged into the network with a login associated with the user.

3. The method of claim 1, wherein associating the plurality of network enabled user devices with the user comprises clustering the plurality of network enabled user devices based on mobility cross entropy.

4. The method of claim 1, further comprising determining a device type for each of the plurality of network enabled user devices.

5. The method of claim 1, wherein applying the one or more predetermined user mobility rules comprises applying a rule indicating that mobile network enabled user devices associated with the user, when changing location, are located with the user.

6. The method of claim 1, wherein applying the one or more predetermined user mobility rules comprises applying a rule indicating that mobile network enabled devices associated with the user may change location, but two or more of the mobile network enabled devices cannot simultaneously move in different directions when changing location.

7. The method of claim 1, further comprising determining a main location of the user in response to tracking locations for each of the plurality of network enabled user devices.

8. The method of claim 7, wherein applying the one or more predetermined user mobility rules comprises applying a rule indicating that when two or more mobile network enabled devices move from the main location of the user, the two or more mobile network enabled devices will return to the main location at the same time.

9. The method of claim 1, further comprising disabling network access for one or more of the plurality of network enabled user devices in response to detecting the user anomaly.

10. The method of claim 1, further comprising sending a message to the second of the plurality of network enabled user devices in response to determining the user anomaly associated with the first of the plurality of network enabled devices.

11. The method of claim 1, wherein tracking locations for the plurality of network enabled user devices comprises applying density based location tag partitioning to the location information.

12. An apparatus comprising:
a network interface unit configured to enable network communications;
a memory; and
a processor coupled to the network interface unit and the memory, wherein the processor is configured to:
associate a plurality of network enabled user devices with a user;
derive location information for each of the plurality of network enabled user devices through activity of the plurality of network enabled user devices on a network;
track locations for the plurality of network enabled user devices from the derived location information;
apply one or more predetermined user mobility pattern rules to the plurality of network enabled user devices;
detect a user anomaly when the tracked locations indicate that a first of the plurality of network enabled user devices has violated one or more of the predetermined user mobility rules; and
transfer application services from the first of the plurality of network enabled user devices to a second of the plurality of network enabled user devices in response to detecting the user anomaly.

13. The apparatus of claim 12, wherein the processor is configured to apply the one or more predetermined user mobility rules by applying a rule indicating that mobile network enabled devices associated with the user may change location, but two or more of the mobile network enabled devices cannot simultaneously move in different directions when changing location.

14. The apparatus of claim 12, wherein the processor is further configured to associate the plurality of network enabled user devices with the user through determining that one or more of the plurality of network enabled user devices has logged into the network with a login associated with the user.

15. The apparatus of claim 12, wherein the processor is further configured to associate the plurality of network enabled user devices with the user through clustering the plurality of network enabled user devices based on mobility cross entropy.

16. The apparatus of claim 12, wherein the processor is further configured to track locations for the plurality of network enabled user devices by applying density based location tag partitioning to the location information.

17. A tangible, non-transitory computer readable medium comprising instructions that when executed by a processor cause the processor to:
associate a plurality of network enabled user devices with a user;
derive location information for each of the plurality of network enabled user devices through activity of the plurality of network enabled user devices on a network;
track locations for the plurality of network enabled user devices from the derived location information;
apply one or more predetermined user mobility pattern rules to the plurality of network enabled user devices;
detect a user anomaly when the tracked locations indicate that a first of the plurality of network enabled user devices has violated one or more of the predetermined user mobility rules; and
transfer application services from the first of the plurality of network enabled user devices to a second of the plurality of network enabled user devices in response to detecting the user anomaly.

18. The computer readable medium of claim 17, wherein the instructions further cause the processor to associate the plurality of network enabled user devices with the user through determining that one or more of the plurality of network enabled user devices has logged into the network with a login associated with the user.

19. The computer readable medium of claim 17, wherein the instructions further cause the processor to associate the plurality of network enabled user devices with the user through clustering the plurality of network enabled user devices based on mobility cross entropy.

20. The computer readable medium of claim 17, wherein the instructions further cause the processor to track locations for the plurality of network enabled user devices by applying density based location tag partitioning to the location information.

* * * * *